United States Patent
Senaratne-Lenagala (10) Patent No.: US 12,402,644 B2
(45) Date of Patent: Sep. 2, 2025

(54) VEGAN FAT PARTICLES AND USE IN PLANT-BASED SAUSAGE ANALOGUE

(71) Applicant: Cargill, Incorporated, Wayzata, MN (US)

(72) Inventor: Lasika Shyamalie Senaratne-Lenagala, Wichita, KS (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 18/785,411

(22) Filed: Jul. 26, 2024

(65) Prior Publication Data
US 2025/0072454 A1 Mar. 6, 2025

Related U.S. Application Data (60) Provisional application No. 63/580,818, filed on Sep. 6, 2023.

(51) Int. Cl.
*A23J 3/22* (2006.01)
*A23D 7/005* (2006.01)
(Continued)

(52) U.S. Cl.
CPC ............ *A23J 3/227* (2013.01); *A23D 7/0053* (2013.01); *A23D 7/04* (2013.01); *A23J 3/14* (2013.01); *A23J 3/18* (2013.01)

(58) Field of Classification Search
CPC ..... A23J 3/227; A23J 3/14; A23J 3/18; A23D 7/0053; A23D 7/04
(Continued)

(56) References Cited

U.S. PATENT DOCUMENTS

| | | | |
|---|---|---|---|
| 3,790,553 | A | 2/1974 | Rao |
| 5,996,917 | A | 12/1999 | Ehrle |

(Continued)

FOREIGN PATENT DOCUMENTS

| | | |
|---|---|---|
| EP | 0603676 A1 | 12/1993 |
| EP | 1493337 A2 | 1/2005 |

(Continued)

OTHER PUBLICATIONS

Field Roast, "Signature Stadium Dog" FieldRoast. com [Online]. Retrieved from the Internet: <URL: https://fieldroast.com/product/signature-stadium-dog/>. Retrieved on Nov. 4, 2021, 3 pages.
(Continued)

*Primary Examiner* — Brent T O'Hern (57) ABSTRACT

A plant-based sausage analogue is prepared by mixing a plant protein sausage meat analogue dough with a vegan fat analogue particle product to form a sausage analogue dough composition, dispensing the sausage analogue dough composition into a casing and cooking to an internal temperature of at least about 180° F. to form a cooked sausage analogue. The vegan fat analogue particle product can be prepared by mixing hydrated plant protein with i) tapioca and/or cassava starch, ii) carrageenan, and iii) konjac. That intermediate composition is mixed with a fat composition to form a paste composition, wherein at least about 33% of the fat composition comprises an oil having a saturated fat content of at least 30%. The paste composition is cooked and the cooked vegan fat is reduced to particles wherein at least 90% of the particles have a maximum dimension between about 2.5 mm and about 10 mm.

11 Claims, 8 Drawing Sheets

(51) Int. Cl.
  *A23D 7/04* (2006.01)
  *A23J 3/14* (2006.01)
  *A23J 3/18* (2006.01)
(58) Field of Classification Search
  USPC .......................................................... 426/602
  See application file for complete search history.

(56) References Cited

U.S. PATENT DOCUMENTS

| | | | |
|---|---|---|---|
| 7,070,827 | B2 | 7/2006 | Cavallini |
| 9,700,067 | B2 | 7/2017 | Fraser |
| 2005/0003071 | A1 | 1/2005 | Cavallini |
| 2009/0208633 | A1 | 8/2009 | Kyed |
| 2013/0243932 | A1 | 9/2013 | Brackenridge |
| 2015/0351440 | A1 | 12/2015 | Cao |
| 2019/0191725 | A1 | 6/2019 | Gladden |
| 2021/0045409 | A1* | 2/2021 | Witteveen ............... A23P 30/25 |

FOREIGN PATENT DOCUMENTS

| | | | |
|---|---|---|---|
| EP | 1817962 | B1 | 11/2011 |
| EP | 3628173 | A1 | 4/2020 |
| GB | 2606409 | A | 11/2022 |
| WO | 2005113236 | A2 | 12/2005 |
| WO | 2017046659 | A1 | 3/2017 |
| WO | 2017192445 | A1 | 11/2017 |
| WO | 2020074858 | A1 | 4/2020 |
| WO | 2020089445 | A1 | 5/2020 |
| WO | 2021216664 | A1 | 10/2021 |
| WO | 2021219845 | A1 | 11/2021 |
| WO | 2022086978 | A1 | 4/2022 |
| WO | 2023039555 | A1 | 3/2023 |
| WO | 2023049750 | A1 | 3/2023 |
| WO | 2023052492 | A1 | 4/2023 |
| WO | 2025/053919 | A1 | 3/2025 |

OTHER PUBLICATIONS

Groves, Melissa, "Vegan Meat Substitutes: The Ultimate Guide", Healthline, Aug. 16, 2018, retrieved from the Internet: <URL: https://www.healthline.com/nutrition/vegan-meat-substitutes#section4>, 17 pages.

Hackett, "How to make Seitan," TheSpruceEats.com [Online] Mar. 29, 2021. Retrieved from the Internet: <URL: https://www.thespruceeats.com/how-to-make-seitan-3376639>, retrieved on May 4, 2023, 5 pages.

Hackett, "What Is Seitan? A Guide to Buying, Cooking, and Storing Seitan," TheSpruceEats.com [Online] Dec. 26, 2022. Retrieved from the Internet: <URL: https://www.thespruceeats.com/what-is-seitan-3376819>, retrieved on May 4, 2023, 7 pages.

Hu et al., "Partial removal of acetyl groups in konjac glucomannan significantly improved the rheological properties and texture of konjac glucomannan and k-carrageenan blends." International journal of biological macromolecules. Feb. 15, 2019; 123:1165-1171.

Huang et al., "Create fat substitute from soybean protein Isolate/konjac glucomannan: The impact of the protein and polysaccharide concentrations formulations." Frontiers in Nutrition 9 (2022). 13 pages.

Ingredion, "Ticagel Kinjac High Viscosity" technical specification, Nov. 10, 2023, 1 page.

LightLife Foods, Inc., "Smart Dogs" LightLife.com [Online]. Retrieved from the Internet: <URL: https://lightlife.com/en-ca/product/smart-dogs/>. Retrieved on Jan. 3, 2022, 7 pages.

Starr, "How to Make Seitan from Any Flour: A Complete Guide," BackyardHomesteadHQ.com [Online], Apr. 24, 2023. Retrieved from the Internet: <URL: https://backyardhomesteadhq.com/how-to-make-seitan-from-any-flour-a-complete-guide/>, retrieved on May 3, 2023, 12 pages.

* cited by examiner

VEGAN FAT PARTICLES AND USE IN PLANT-BASED SAUSAGE ANALOGUE

CROSS-REFERENCE TO RELATED APPLICATIONS

This application claims the benefit of U.S. Provisional Application No. 63/580,818, filed Sep. 6, 2023, which is incorporated by reference herein in its entirety.

FIELD

The present invention relates to plant-based sausage analogue products. In particular, the present invention relates to vegan fat particles and their use in plant-based sausage analogue.

BACKGROUND

Consumers increasingly desire protein choices that are alternatives to animal meat protein for a variety of reasons. At the same time, many consumers enjoy the flavors and textures that are uniquely provided by meats obtained from animals. For this reason, a number of companies have striven to provide plant-based meat substitutes that replicate the experience of cooking and eating meat.

SUMMARY

Meat analogue products for purposes of the present discussion are food products that mimic meat but which contain no animal meat ingredients. Previous attempts at preparing meat analogue products often fall short of the desired organoleptic experience, because they lack one or more of the visual and textural characteristics of the animal meat it is intended to mimic. Moreover, it is particularly challenging to achieve the desired consistency and texture of the meat analogue product while using only non-animal-sourced components, without incorporating a number of additives that present a long ingredient list with names that sound artificial and undesirable to the average consumer.

The interplay between the protein components and the fat components of the animal meat is difficult to mimic when using non-meat sourced ingredients. First, the flavor of course must meet customer expectations, which is challenge enough. Sausage products having visible fat particles are a challenging meat product to mimic, because the visual and texture characteristic are in prominent display when presented as a sliced product. Moreover, certain sausage products, such as pepperoni or chorizo, raise additional challenges because the fat particles in these sausages do not melt when heated to a cooked product temperature, such as 165° F. or 200° F. or 220° F. (74° C. or 93° C. or 104° C.), depending on the type of sausage or the level of heating required to prepare the food product containing the sausage.

For example, pepperoni sausage is routinely used as topping for pizzas or like baked foods. Effective mimicking of the expected appearance of pepperoni requires an appropriate color and translucency balance of the sausage components, so that the "fat" particles component is visually apparent and distinct from the "meat" component of the pepperoni sausage through the temperature range to which the sausage is expected to be exposed. Thus, the sausage analogue product must have a proper appearance in color and texture when cold or at room temperature, and for applications where the sausage being mimicked has non-melting fat, the sausage analogue product must maintain the appropriate color and texture even when heated to temperatures at or above 165° F. or 200° F. or 220° F. Conventional fat mimetics melt when heated to high temperatures, and therefore do not meet this high temperature performance requirement.

Likewise, many sausage products having fat particles that are visually apparent even after heating to high temperatures also are strongly colored in the meat component of the sausage, e.g., with paprika or other peppers, or seasonings. The fat particles in sausage analogue products that mimic such strongly colored sausages must therefore resist color bleeding from the meat component into the fat particle component that would adversely diminish visibility of the fat particles in the sausage after heating.

Additionally, sausage has a characteristic flavor profile created in part by being acidic in nature. For this reason, the choice of permitting ingredients to be used in preparation of a plant-based sausage analogue is limited to those components that keep the pH of the product at about 5.5 or lower. This requirement removes a number of tools that might otherwise be used in formulating sausage mimetic products.

It has been found that a superior plant-based sausage analogue may be prepared by carefully selecting the components and processing steps in preparing vegan fat particles. The resulting product exhibits excellent organoleptic benefits, such as sensory, visual, mouthfeel, color, and flavor properties at refrigerated temperature, room temperature and high cooking temperature (i.e., at 200° F.).

In an aspect, a method of preparing a vegan fat analogue particle product comprises
  a) mixing plant protein with water to form a hydrated plant protein,
  b) mixing the hydrated plant protein with
    i) tapioca and/or cassava starch,
    ii) carrageenan, and
    iii) konjac to form a protein intermediate composition,
  c) mixing the protein intermediate composition with a fat intermediate composition to form a paste composition;
  d) cooking the paste composition to an internal temperature of at least about 180° F. to form a cooked vegan fat analogue;
  e) cooling the cooked vegan fat analogue to an internal temperature of from about 30° F. to about 45° F. to provide a cooled vegan fat analogue; and
  f) reducing the cooled vegan fat analogue to particles to form a vegan fat analogue particle product, wherein at least 90% of the vegan fat analogue particles have a maximum dimension between about 2.5 mm and about 10 mm;
  wherein the vegan fat analogue particle product comprises:
    from about 45 wt % to about 60 wt % water,
    from about 6 wt % to about 12 wt % plant protein,
    from about 10 wt % to about 22 w % oil,
    from about 12 wt % to about 24 wt % tapioca and/or cassava starch,
    from about 1 wt % to about 6 wt % konjac, and
    from about 1 wt % to about 6 wt % carrageenan.

It has been found that pea protein is very effective for preparation of vegan fat analogue particles to mimic pepperoni sausage, as described further herein.

In an aspect, a plant-based sausage analogue is prepared by a method comprising:
  a) mixing a plant protein composition, water, paprika, acid and salt to form a plant protein sausage meat analogue dough having a pH of about 5.5 or lower, b) mixing the plant protein sausage meat analogue dough with the vegan fat analogue particle product as described herein in a fat analogue/meat analogue weight ratio of about 0.1 to 0.4, about 0.15-0.4, or about 0.2 to 0.4 to form a sausage analogue dough composition, c) dispensing the sausage analogue dough composition into a casing to form a dough log, d) cooking the dough log to an internal temperature of at least about 180° F. to form a cooked sausage analogue, and e) chilling the cooked sausage analogue to an internal temperature of from about 30° F. to about 45° F. to provide a sausage analogue;

wherein the vegan sausage slice product has a pH of about 5.5 or lower.

In an aspect, the sausage analogue is sliced to thicknesses of from about 1.5 mm to about 5 mm to form a sliced sausage analogue.

BRIEF DESCRIPTION OF THE SEVERAL VIEWS OF THE DRAWING(S)

The accompanying drawings, which are incorporated in and constitute a part of this application, illustrate several aspects of the invention and together with a description of the embodiments serve to explain the principles of the invention. Where photographs are used, the photograph is provided in grayscale. Counterpart color copies of such grayscale photographs are provided as supplemental content in the present provisional application for reference as appropriate in various jurisdictions and for presentation in jurisdictions that permit submission of drawings in color.

A brief description of the drawings is as follows.

DETAILED DESCRIPTION

In the present method of preparing a vegan fat analogue particle product, plant protein is mixed with water to form a hydrated plant protein.

In an aspect, the plant protein used for preparation of the vegan fat analogue particle product is obtained from a plant protein source selected from the group consisting of alfalfa, algal, barley, bean, broad bean, chia, clover, chickpea, corn, cow pea, earth pea, sweet pea, pigeon pea, fava bean, kidney bean, mung bean, navy bean, soy, legume, lentil, lupin, mesquite, cocoa, carob, nut, peanut, pea, almond, potato, cereal, sorghum, fonio, quinoa, hemp, fungal, seaweed protein, or mixtures thereof.

In an aspect, the plant protein used for preparation of the vegan fat analogue particle product is obtained from a plant protein source selected from the group consisting of bean, broad bean, corn, pea, chickpea, cow pea, earth pea, sweet pea, pigeon pea, fava bean, kidney bean, mung bean, navy bean, soy, legume, lentil, potato protein, and mixtures thereof. In an aspect, the plant protein used for preparation of the vegan fat analogue particle product is obtained from a plant protein source selected from the group consisting of soy, pea or mixtures thereof.

In the present method of preparing a vegan fat analogue particle product, plant protein is mixed with water to form a hydrated plant protein. It has been found that the selection of pea as the protein source in the vegan fat analogue particle product significantly contributes to providing particles that have the appropriate, slightly yellow color for use as the fat analogue in a plant-based pepperoni product. Proteins sourced from other plant sources, such as soy, do not provide a vegan fat analogue particle the correct color matching. For example, vegan fat analogue particles prepared from soy were found to be too translucent, and therefore were not appropriately visually identifiable in the final plant-based pepperoni product. It is particularly advantageous that this color matching can be obtained by selection of the correct "natural" ingredients, without the need to resort to inclusion of colorants to provide the desired fat particle appearance.

In an aspect, the plant protein used in the present method is provided from a plant protein composition. The plant protein composition may be a plant protein concentrate composition, i.e., the source composition contains not less than 55% protein on a moisture-free basis. The plant protein composition may be a plant protein isolate composition, i.e., the source composition contains not less than 85% protein on a moisture-free basis.

In an aspect, the plant protein used in the present method is a powdered plant protein having a particle size range of from about 20 to about 300 μm. In an aspect, the plant protein used in the present method is a textured plant protein having a particle size range of from about 0.2 to about 20 mm.

The plant protein is hydrated by mixing with water in any appropriate vessel, such as a mixer or blender.

In an aspect, water is mixed with the plant protein composition at a water temperature of from about 40° F. to about 90° F. In an aspect, water is mixed with the plant protein composition at a water temperature of from about 40° F. to about 75° F. In an aspect, water is mixed with the plant protein composition at a water temperature of from about 60° F. to about 75° F.

The water and the plant protein are present in an amount effective to provide a final vegan fat analogue particle product having from about 45 wt % to about 60 wt % water and from about 6 wt % to about 12 wt % plant protein. To avoid confusion, it is noted that the identified amount of plant protein is the protein content itself without regard to non-protein components that may additionally be present from the plant protein source. By way of example, adding 100 g of a plant protein isolate that is 80 wt % plant protein will contribute 80 g of plant protein to the final vegan fat analogue particle product.

In an aspect, water is mixed with the plant protein composition in a water:(plant protein composition) weight ratio of from about 2:1 to about 9:1, e.g., about 4:1 to 8:1. A water:(plant protein composition) weight ratio of about or about 5:1 to about 7:1 or about 5.5:1 to about 6.5, e.g., about 6:1, delivers vegan fat analogue particles that perform well in plant-based meat analogues, including plant-based sausage analogues.

Viewed on the basis of the plant protein content, water may be mixed with the plant protein composition in a water:(plant protein) weight ratio of from about 5:1 to about 10:1, e.g., about 6:1 to 9:1. A water:(plant protein) weight ratio of about 7:1 to about 8:1, e.g., about 7.5:1, delivers vegan fat analogue particles that perform well in plant-based meat analogues, including plant-based sausage analogues.

The hydrated plant protein is then mixed with i) tapioca and/or cassava starch ii) carrageenan and iii) konjac to form a protein intermediate composition. It has been found that the selection of these ingredients for use in the vegan fat analogue particle product significantly contributes to providing particles that have the appropriate gel strength and heat resistance over the desired temperature range, which may span from a refrigeration temperature of 35° F. to a heated temperature of 250° F. By use of these materials, it has been found that the desired gel strength and heat resistance may be obtained without needing to include protein-protein crosslinking agents, such as transglutaminase. Transglutaminase is produced from both animal and plant sources and therefore may be disfavored in vegan markets. Additionally, the use of transglutaminase may not be permitted in some jurisdictions. Thus, the present vegan fat analogue particle products are preferably free of added transglutaminase.

The i) tapioca and/or cassava starch ii) carrageenan and iii) konjac are present in an amount effective to provide a final vegan fat analogue particle product having from about 12 wt % to about 24 wt % tapioca and/or cassava starch, from about 1 wt % to about 6 wt % konjac, and from about 1 wt % to about 6 wt % carrageenan.

Any suitable mixing device may be used to carry out the above discussed mixing steps to prepare the vegan fat analogue particle product. Examples of suitable equipment include blenders or mixing devices that use an impeller such as a paddle blender or bowl chopper. In an aspect, the mixer is configured and operated in a manner such that the mixer does not impart excess bulk pressure to the composition being mixed. In an aspect, the mixing is not carried out in an extruder exerting 1.5 MPa or more of pressure.

The above prepared protein intermediate composition is mixed with a fat intermediate composition in an amount effective to provide a paste composition having from about 10 wt % to about 22 w % oil.

As noted above, the protein intermediate composition is mixed with a fat composition to form a paste composition. The fat composition can comprise any non-animal fats, also referred to as "vegetable oils" even though some of the plant sources technically are not vegetables, e.g., coconuts. Suitable fats in the fatty acid composition include coconut oil, cocoa butter, palm oil, palm kernel oil, cottonseed oil, or mixtures or interesterifications thereof.

If so desired, the fat composition may be a mixture or interesterification of a "solid" fat or "hard stock" with a liquid or semi-solid oil. Suitable solid fats for use in such mixtures or interesterifications include coconut oil, palm kernel oil, cottonseed oil, or mixtures or interesterifications thereof. Suitable liquid or semi-solid fats include soybean oil, sunflower oil, corn oil, canola oil, or mixtures or interesterifications thereof.

The fat composition may have a slip melting point, determined in accordance with AOCS Cc 3-25, of greater than 20° C. so it is sold at room temperature. The slip melting point may be greater than 22° C., greater than 23° C., greater than 24° C., greater than 25° C., greater than 26° C., greater than 27° C., greater than 28° C., greater than 30° C., greater than 32° C., or greater than 33° C. A slip melting point significantly higher than body temperature (nominally 37° C./98.6° F.) may to provide an undesirable mouthfeel. The slip melting point may be less than 40° C., less than 35° C., less than 33° C., less than 32° C., less than 31° C., or less than 30° C. The fat composition may have a slip melting point of between 22° C. and 40° C., between 23° C. and 35° C., between 23° C. and 33° C., between 23° C. and 32° C., between 24° C. and 35° C., between 24° C. and 33° C., between 24° C. and 32° C., between 25° C. and 35° C., between 25° C. and 33° C., or between 25° C. and 32° C.

The saturated fat content of the fat composition can be adapted to meet sensory and nutrition objectives. Saturated fat content, as used herein, is the percentage of fatty acid moieties that are saturated fatty acids determined in accordance with AOCS Procedure Ce 1e-91. The fat composition may have a saturated fat content of greater than 60%, greater than 70%, greater than 75%, greater than 80%, or greater than 85%. For example, the saturated fat content may be between 60% and 98%, between 70% and 98%, between 75% and 98%, between 80% and 98%, between 70% and 95%, between 75% and 95%, between 80% and 95%, or between 85% and 95%.

Coconut oil has worked well for vegan fat analogue particles used in plant-based sausage analogues. Vegan fat analogue particles made with coconut oil have proven well-suited for use in plant-based sausage analogues, including plant-based pepperoni sausage analogue slices that retained discrete fat particles without undue greasing out when cooked on a pizza.

In an aspect, the paste composition is mixed under mixing conditions to provide mixing of the ingredients for forming vegan fat analogue particles that are substantially compositionally uniform (i.e. the particles vary in composition less than 5% in any given ingredient).

In an aspect, the paste composition is mixed under emulsifying high shear conditions (i.e., under sufficient shear to promote forming an emulsion). It has been found that mixing of components under high shear provides efficient and effective mixing for better distribution of materials and leading to a high-quality composition for forming vegan fat analogue particles that are compositionally uniform (i.e., the particles vary in composition less than 3% in any given ingredient).

In an aspect, the mixing under emulsifying high shear conditions is carried out using a high shear mixer. In an aspect, the mixing apparatus is a food chopper, bowl chopper, or food processor.

For purposes of the present description, a food chopper is a food cutter having a flat surface for receiving food to be cut, and one or more vertically movable cutting blades configured to chop the plant-sourced composition into pieces.

In an aspect, the mixing apparatus is a bowl chopper. For purposes of the present description, a bowl chopper is a food cutter having a rotary bowl for receiving food to be cut, and one or more vertically oriented blades (also described as "knives" in the art) attached to a horizontally oriented rotary knife shaft. The rotary bowl rotates around a vertical axis, and the blades cut by rotation of the horizontally oriented rotary knife shaft. The blades are aligned relative to the internal wall or walls of the bowl such that they may chop and mix the food within the bowl. While the lateral position of the rotary knife shaft is substantially stationary, the bowl and the contents therein rotate relative to the blades whereby the contents are continuously moved against the blades as the bowl is rotating. In an aspect, the blades may be run in only a forward direction, or in an aspect run in both a forward direction and a reverse direction. Bowl choppers are commercially available, and are described, for example, in U.S. Pat. No. 5,996,917, the disclosure of which is incorporated herein by reference. The use of a bowl chopper in the present process is particularly advantageous, because it efficiently performs a cutting function as it mixes the material.

In an aspect, the mixing apparatus is a food processor. For purposes of the present description, a food processor is a food cutter having a food container for receiving food to be cut that is fitted with a hub configured to be coupled to a drive shaft of the food processor. One or more blades are rotatably coupled to the hub. In the case of the food processor, the blades are horizontally oriented, and the hub and drive shaft are generally vertically oriented. In an aspect, the blades may be run in only a forward direction, or in an aspect run in both a forward direction and a reverse direction. Food processors are commercially available. In an aspect, the food processor is a Robo coupe type food processor.

The resulting paste composition is formed into a shape to facilitate complete cooking and/or ease of processing after cooking to form vegan fat particles in appropriate sizes for use in the ultimate product. In an aspect, the paste composition is formed into a shape having a maximum thickness in at least one dimension of about 5 inches or less, or a shape having a maximum thickness in at least one dimension of about from about 5 inches to about 0.5 inches, or a shape having a maximum thickness in at least one dimension of about from about 3 inches to about 0.5 inches, or a shape having a maximum thickness in at least one dimension of about from about 1.5 inches to about 0.5. In an aspect, the paste composition is formed into a shape selected from a sphere, half-sphere, oval, half oval, cylinder, or cuboid.

In an aspect, the paste composition may be dispensed (before or after forming) into a cooking bag, a vacuum is applied to remove or substantially reduce undesired air pockets or bubbles before cooking. Air pockets and bubbles can adversely impact the visual appeal and texture of the vegan fat particles, as well as binding of the particles in the final sausage analogue product. Any suitable vacuum system may be used to "degas" the paste composition to remove air pockets. The cooking bag may be any bag material suitable for use in cooking at high temperature. In an aspect, the cooking bag is an artificial cooking bag manufactured from synthetic substances. In an aspect, the cooking bag is an artificial cooking bag manufactured from thermoplastic materials ("synthetic cooking bags"). In an aspect, the synthetic cooking bags are mechanically strong, relatively heat resistant, impermeable to smoke, gases and water vapor.

In an aspect, the cooking bag is prepared from a material selected from polyamide (PA), polyethylene (PE), polypropylene (PP), polyvinylidene chloride (PVDC) and polyester (PET).

The bagged and formed paste composition is then cooked in the bag to an internal temperature of at least about 180° F. to form a cooked vegan fat analogue. In aspect, the bagged vegan fat layer is cooked stepwise at progressive temperatures. In an aspect, the bagged vegan fat layer is cooked in a first step at 180° F. for a time of from about 45 to about 60 minutes, and then at 200° F. for about 75 minutes, or until bagged vegan fat layer reaches an internal temperature of at least about 180° F. In an aspect, the bagged vegan fat layer is cooked to an internal temperature of from about 180° F. to about 200° F. In an aspect, the bagged vegan fat layer is cooked at 80% or higher humidity conditions. In an aspect, the bagged vegan fat layer is cooked at 100% humidity conditions. It has been found that cooking under high humidity conditions works well to provide vegan fat layer with excellent properties.

Using a cooking bag and applying a vacuum is preferred because preparation of paste compositions in this way can promote proper cooking and improve appearance of the vegan fat analogue particles. If so desired, though, one could omit the cooking bag, vacuum degassing, or both. In such a circumstance, the paste composition may be deposited on a surface and formed in a shape as described above and cooked at the same temperature or progressive temperatures as described for the bagged vegan fat layer.

It has been found that cooking of the paste composition in this way provides an enhanced consistency of the final vegan fat analogue product for an appropriate mouthfeel in use. Such a vegan fat analogue product can provide plant-based pepperoni analogue a desirable mouthfeel when the pepperoni analogue is cooked, and it remains intact in the pepperoni analogue and does not melt away when cooked in the final product application (such as on a pizza) to a temperature of 200° F.

The cooked vegan fat layer is cooled to an internal temperature of from about −30° F. to about 45° F. to provide a cooled vegan fat layer. The cooled vegan fat layer is reduced in size to particle sizes of from about 2 mm to about 10 mm to form a vegan fat analogue particle product.

Reduction of particle size of the cooled vegan fat layer may be carried out as a single step or multiple steps. For example, the cooled vegan fat layer may first be sliced and/or diced as a first step particle size reduction, and then placed in a high shear mixer such as discussed above to further reduce the cooled vegan fat layer to form a vegan fat analogue particle product of the desired particle sizes. In an aspect, particle size reduction may be carried out at a temperature from about 40° F. to about 45° F. ambient temperature to avoid melting of the fat layer during particle size reduction. In an aspect, particle size reduction may be carried out at a temperature from about 0° F. to about 40° F. ambient temperature to avoid melting of the fat layer during particle size reduction.

In an aspect, the resulting vegan fat analogue particles are separated by particle sizing techniques, such as use of particle sieves, to provide a desired particle size distribution. In an aspect, the particles are sieved to remove fines that would pass through a US Mesh Size 8 screen, which has a nominal opening size of about 2.38 mm. The resultant sieved fat analogue particles can be referred to as a +8 US Mesh particle size. In an aspect, at least 90% of the fat analogue particles have a maximum dimension between about 2.5 mm and about 10 mm. In an aspect, the particles are sieved to remove particles exceeding about 10 mm.

The meat mimetic portion of the sausage product is provided by preparing a plant protein sausage meat analogue dough. This composition prepared by mixing a plant protein composition, water, paprika, acid and salt to form a plant protein sausage meat analogue dough having a pH of about 5.5 or lower.

In an aspect, the plant protein sausage meat analogue dough is prepared in a multi-step process comprising:
a) mixing non-gluten plant protein with water to form a hydrated non-gluten plant protein,
b) mixing the hydrated non-gluten plant protein with a plant-based oil and hydrocolloid to form a protein intermediate composition,
c) mixing the protein intermediate composition with Vital Wheat Gluten to form a protein/gluten mixture intermediate composition, and
d) mixing the protein/gluten mixture intermediate composition with an edible acid to form a plant protein sausage meat analogue dough wherein
the plant-based dough comprises
from about 5 wt % to about 20 wt % non-gluten plant protein
from about 40 wt % to about 87 wt % water
from about 0.5 wt % to about 6 w % oil
from about 2 wt % to about 10 wt % hydrocolloid
from about 5 wt % to about 20 wt % Vital Wheat Gluten and
edible acid in an amount sufficient to provide a dough having a pH of from about 3.5 to about 5.5.

In an aspect, the non-gluten plant protein used in the present method is obtained from a plant protein source selected from the group consisting of alfalfa, algal, barley, bean, broad bean, chia, clover, chickpea, corn, cow pea, earth pea, sweet pea, pigeon pea, fava bean, kidney bean, mung bean, navy bean, soy, legume, lentil, lupin, mesquite, cocoa, carob, nut, peanut, pea, almond, potato, cereal, sorghum, fonio, quinoa, hemp, fungal, seaweed protein, or mixtures thereof.

In an aspect, the non-gluten plant protein used in the present method is obtained from a plant protein source selected from the group consisting of bean, broad bean, corn, pea, chickpea, cow pea, earth pea, sweet pea, pigeon pea, fava bean, kidney bean, mung bean, navy bean, soy, legume, lentil, potato protein, and mixtures thereof. In an aspect, the non-gluten plant protein used in the present process is obtained from a plant protein source selected from the group consisting of soy, pea or mixtures thereof. For certain end uses, such as in a plant-based pepperoni analogue, a non-gluten plant protein that includes at least 60 wt %, at least 70 wt %, at least 80 wt %, at least 90 wt %, or at least 95 wt %] pea protein is preferred as it can provide a more desirable color and opacity.

In an aspect, the non-gluten plant protein used in the present method is provided in a non-gluten plant protein composition, i.e. a composition comprising the non-gluten plant protein and non-protein components from the plant protein source. In an aspect, the non-gluten plant protein composition may be a non-gluten plant protein concentrate composition, i.e., the source composition contains not less than 55% protein on a moisture-free basis. The non-gluten plant protein composition may be a non-gluten plant protein isolate composition, i.e., the source composition contains not less than 85% protein on a moisture-free basis.

The non-gluten plant protein composition may include minor amounts of gluten, e.g., up to about 10 wt % of the plant protein in the non-gluten plant protein composition. Preferably, the non-gluten plant protein composition is gluten-free or substantially gluten-free, e.g., less than 2 wt %, less than 1.5 wt %, less than 1 wt %, less than 0.5 wt %, less than 0.1 wt %, 0.001-2 wt %, 0.001-1 wt %, 0.001-0.5 wt %, or 0.001-0.1 wt % of the plant protein in the non-gluten plant protein composition.

In an aspect, the non-gluten plant protein used in the present process is a powdered plant protein having a particle size range of from about 20 to about 150 μm or having a 100 US Mesh particle size, i.e., the non-gluten plant protein can pass through a US Mesh Size 100 screen, which has a nominal opening size of about 150 μm. In an aspect, the non-gluten plant protein used in the present process is a textured plant protein having a particle size range of from about 0.2 to about 20 mm.

In an aspect, the non-gluten plant protein is provided in an amount effective to provide a plant-based deli meat analogue product comprising from about 3 wt % to about 20 wt % non-gluten plant protein. In an aspect, the non-gluten plant protein is provided in an amount effective to provide a plant-based deli meat analogue product comprising from about 4 wt % to about 10 w % non-gluten plant protein. To avoid confusion, it is noted that the identified amount of non-gluten plant protein is the protein content itself without regard to non-protein components that may additionally be present from the plant protein source. By way of example, adding 100 g of a soy protein isolate that is 80 wt % soy protein will contribute 80 g of non-gluten plant protein to the plant-based deli meat analogue.

The plant protein is hydrated by mixing the plant protein composition with water in any appropriate vessel, such as a mixer or blender. In an aspect, water is mixed with the plant protein composition in a water:(protein composition) weight ratio of from about 2:1 to about 4:1. In an aspect, water is mixed with the plant protein composition in a water:(protein composition) weight ratio of about 3:1.

In an aspect, water is mixed with the plant protein composition at a water temperature of from about 40° F. to about 90° F. In an aspect, water is mixed with the plant protein composition at a water temperature of from about 40° F. to about 75° F. In an aspect, water is mixed with the plant protein composition at a water temperature of from about 60° F. to about 75° F.

In an aspect, the composition comprising hydrated plant protein comprises an additional ingredient selected from flavors, colorant, preservative (i.e., an ingredient to prevent or retard micro growth and/or spoilage), fiber, vitamins, and minerals.

In an aspect, the composition comprising hydrated plant protein comprises flavor ingredients selected to mimic the flavor of pepperoni sausage. It has been found that the use of characteristic pepperoni flavors in the plant protein pepperoni meat analogue dough is very important to provide the desired organoleptic effect. In particular, it is desirable to use paprika, acid and salt to provide the color and flavor notes expected in pepperoni sausage. In an aspect, the plant protein pepperoni meat analogue dough comprises paprika, garlic, yeast, lactic acid, smoke spices, and salt.

In an aspect, any of the desired added ingredients may be added to the dry plant protein composition, or to the hydration water or both.

The resultant hydrated non-gluten plant protein is mixed with a plant-based oil and hydrocolloid to form a protein intermediate composition.

In an aspect, the plant-based oil is selected from the group consisting of avocado, canola, coconut, cocoa, corn, cottonseed, flax, olive, palm, palm kernel, peanut, rapeseed, safflower, soya, and sunflower oils and mixtures thereof. Sunflower oil, coconut oil, and mixtures thereof have worked well. In an aspect, the plant-based oil is selected from unsaturated plant-based oils. In an aspect, the plant-based oil is selected from poly-unsaturated plant-based oils.

In an aspect, the plant-based oil is mixed with the hydrated non-gluten plant protein in an amount effective to provide a plant-based deli meat analogue product comprising from about 0.5 wt % to about 6 w % oil. In an aspect, the plant-based oil is mixed with the hydrated non-gluten plant protein in an amount effective to provide a plant-based deli meat analogue product comprising from about 2 wt % to about 4 w % oil.

In an aspect, the hydrocolloid incorporated in the plant-based deli meat analogue product is selected from the group consisting of hydrocolloid gums, hydrocolloid starches, hydrocolloid water soluble fibers, and mixtures thereof.

In an aspect, the hydrocolloid present in the plant-based deli meat analogue product comprises at least one hydrocolloid gum component, at least one hydrocolloid starch component, and at least one hydrocolloid water soluble fiber component.

In an aspect, the hydrocolloid gum component is selected from locust bean gum, carrageenan (seaweed extract), guar gum, xanthan gum, gellan gum, scleroglucan, agar, pectin, alginate, gum acacia, and mixtures thereof.

In an aspect, the hydrocolloid water soluble fiber component is selected from water soluble fibers or mixtures of soluble and insoluble fibers, such as konjac glucomannan and citrus fiber.

In an aspect, the hydrocolloid starch component is selected from starches derived from sources including but are not limited to fruits, seeds, and rhizomes or tubers of plants. In an aspect, sources of starch include but are not limited to rice, wheat, corn, potatoes, tapioca, arrowroot, buckwheat, banana, barley, cassava, kudzu, oca, sago, sorghum, sweet potatoes, taro and yams. In an aspect, the starch is selected from cassava starch, tapioca starch, and mixtures thereof.

In an aspect, the starch may be one or more modified starches, i.e., a starch that has been altered from its native state, resulting in modification of one or more of its chemical or physical properties. Starches may be modified, for example, by enzymes, oxidation or, substitution with various compounds. Starches can be modified to increase stability against heat, acids, or freezing, improved texture, increase or decrease viscosity, increase or decrease gelatinization times, and increase or decrease solubility, among others. Modified starches may be partially or completely degraded into shorter chains or glucose molecules, or modified by substitution to have a different chemical composition. In an aspect, the starch may be a nOSA starch, i.e., a modified starch that has been partially substituted with n-octenyl succinic anhydride.

In an aspect, the hydrocolloid comprises:
from about 0.1 wt % to about 5 wt % carrageenan
from about 0.1 wt % to about 5 wt % konjac glucomannan
from about 0.1 wt % to about 5 wt % wt % citrus fiber
from about 0.1 wt % to about 5 wt % wt % tapioca starch,
all amounts based on the total amount of plant protein sausage meat analogue dough.

In an aspect, the plant-based oil and hydrocolloid may be mixed with the hydrated non-gluten plant protein at the same time, or either component may be mixed with the hydrated non-gluten plant protein before the other component.

In an aspect, the hydrocolloid is mixed with the hydrated non-gluten plant protein in an amount effective to provide a plant protein sausage meat analogue dough comprising from about 2 wt % to about 10 wt % hydrocolloid.

For purposes of the present disclosure, "Vital Wheat Gluten" refers to a protein extract of wheat flour prepared by removing a significant portion of the starch, fibers, pentosans and water-soluble materials from wheat flour. Vital Wheat Gluten is commercially available, and may be obtained by any appropriate process such as, for example, as disclosed in U.S. Pat. No. 3,790,553. In an aspect, Vital Wheat Gluten has a protein content of 70% to 99% dry weight. In an aspect, Vital Wheat Gluten has a protein content of about 75% to about 80% dry weight. However, one skilled in the art will recognize that gluten is the protein found and/or derived from wheat, barley, rye, oats, and related species and/or hybrids of wheat, barley, rye, and oat. As used herein, "gluten" refers to gluten from such plant sources, as well as mixtures of glutens from such plant sources. For sake of clarity, though, "gluten" as used herein does not refer to protein from corn or rice even though the terms "corn gluten" and "rice gluten" are used in some contexts, e.g., in animal feed.

In an aspect, the Vital Wheat Gluten is mixed with the protein intermediate composition in an amount effective to provide a plant protein sausage meat analogue dough comprising from about 10 wt % to about 20 wt % Vital Wheat Gluten. In an aspect, the Vital Wheat Gluten is mixed with the protein intermediate composition in an amount effective to provide a plant protein sausage meat analogue dough comprising from about 12 wt % to about 18 wt % Vital Wheat Gluten. To avoid confusion, it is noted that this identified amount of Vital Wheat Gluten is the gluten protein content itself without regard to non-protein components that may additionally be present from the Vital Wheat Gluten source. By way of example, adding 100 g of a wheat protein concentrate that is 75 wt % gluten will contribute 75 g of Vital Wheat Gluten to the plant-based deli meat analogue.

For purposes of the present disclosure, an "edible acid" may be any acid suitable to be used in food. In an aspect, the acid is selected from the group consisting of citric acid, lactic acid, acetic acid, or mixtures thereof. In an aspect, the acetic acid is provided as vinegar. Lactic acid is preferred in some plant-based pepperoni analogues because it helps reproduce the characteristic flavor of traditional pepperoni, which is often mildly fermented using lactic acid-producing bacteria.

In an aspect, the plant protein sausage meat analogue dough comprises edible acid in an amount sufficient to provide a dough having a pH of from about 3.5 to about 5.5. In an aspect, the plant protein sausage meat analogue dough comprises edible acid in an amount sufficient to provide a dough having a pH of from about 4 to about 5.

In an aspect, the plant-based deli meat analogue product comprises edible acid in an amount of from about 0.5 wt % to about 5 wt %. In an aspect, the plant-based deli meat analogue product comprises edible acid selected from the group consisting of acetic acid, citric acid, lactic acid, and mixtures thereof.

The protein/gluten mixture intermediate composition is mixed with the edible acid. It has been found that when the analogue dough is mixed with Vital Wheat Gluten under pH neutral conditions, the dough becomes very stiff and unsuitable for use in forming a sausage, and additionally does not absorb water well. In contrast, when the analogue dough is mixed with Vital Wheat Gluten together with the edible acid, gluten strands are developed to provide elastic strands that are not crosslinked in a manner that would unduly increase the viscosity of the dough. It has been found that mixing of the protein/gluten mixture intermediate composition with the edible acid under these conditions imparts an elastic structure to the plant-based dough, providing an enhanced meat-like texture in the final plant-based sausage analogue product. Additionally, when the analogue dough is mixed with Vital Wheat Gluten together with the edible acid, the resulting composition does absorb water well, providing a dough that absorbs water during mixing, and is easily manipulated for mixing with additional ingredients and dispensing into a casing for cooking.

In an aspect, the protein/gluten mixture intermediate composition is mixed with the edible acid under gluten strand development shear conditions, (i.e. under sufficient shear to provide a dough that stretches when physically pulled apart and wherein all water is absorbed in the dough when water is present as 50% of the dough formulation.

The plant protein sausage meat analogue dough is mixed with the vegan fat analogue particle product to form a sausage analogue dough composition. A weight ratio of fat analogue/meat analogue is about 0.1 to about 0.4, e.g., from about 0.15 to about 0.35.

The sausage analogue dough composition is dispensed into a casing to form a dough log.

In an aspect, the casing is an artificial casing. In an aspect, the casing is an artificial casing manufactured from natural materials. In an aspect, the casing is an artificial casing made of natural materials selected from cellulosic casings and collagen casings. In an aspect, the casing is an artificial casing made of natural materials that is permeable to gases, smoke and water vapor. In an aspect, the artificial casings made of natural materials are edible, and therefore do not need to be removed from the encased plant-based deli meat analogue product when being eaten by a consumer.

In an aspect, the casing is an artificial casing manufactured from synthetic substances. In an aspect, the casing is an artificial casing manufactured from thermoplastic materials ("synthetic casings"). In an aspect, the synthetic casings are mechanically strong, relatively heat resistant, impermeable to smoke, gases, and water vapor.

In an aspect, the casing is prepared from a material selected from polyamide (PA), polyethylene (PE), polypropylene (PP), polyvinylidene chloride (PVDC) and polyester (PET). The above-mentioned categorization of casings is disclosed in the FAO (Food and Agriculture Organization of the United Nations) Corporate Document Repository under the Title "Meat processing technology for small and medium-scale producers" under the keyword "Casings".

In an aspect, the casing is made of a mono- or multilayered film of which at least one layer comprises a film-forming synthetic polymer. Such casings for processed meat products are well known in the art. In an aspect, the casings, such as sausage casings, are typically made of 1-5 layered films. In an aspect, the film-forming polymer of at least one film layer is a thermoplastic synthetic polymer. In an aspect, the thermoplastic synthetic polymer is a polyamide, polyethylene, polypropylene, polyvinylidene chloride or polyester. In an aspect, the film layer can contain adjuvants, such as plasticizers, colorants or other known additives, but they should not substantially affect the film-forming properties of the synthetic polymer and other properties that are provided by the synthetic polymer to the casing, such as its known impermeability to smoke, water vapor or other gases. In an aspect, the water vapor impermeable casings have water vapor permeability of not more than 10 g/m2·d, or not more than 9 g/m2·d, measured according to DIN 53122 at 38° C. and 100% relative humidity. A wide variety of water vapor impermeable casings are disclosed in the art, e.g., in European Patent Application Nos. EP 0 603 676 and EP 1 817 962 and in International Patent Application Nos. WO 2005/113236 and WO 2017/192445; the disclosures of which are incorporated herein by reference with respect to the discussions regarding the preparation, identity and use of casings provided therein.

In an aspect, the casing is permeable to water vapor.

In an aspect, when the casing is filled, the casing has a generally cylindrical shape, but other shapes may also be suitable.

In an aspect, the thus-prepared encased uncooked dough log is then cooked to an internal temperature of at least about 180° F., e.g., at least about 190° F. or at least about 195° F., to form an encased cooked pepperoni analogue sausage. In an aspect, the thus-prepared encased uncooked dough log is then cooked to an internal temperature of from about 180° F. to about 220° F., e.g., from about 185° F. to about 210° F. or from about 190° F. to about 210° F., to form an encased cooked pepperoni analogue sausage.

In an aspect, the casing is permeable to water vapor. It has been found that cooking of an encased uncooked dough log having a water vapor permeable casing in a steam oven is particularly effective in achieving the desired texture properties of the final cooked product. While not being bound by theory, it is believed that cooking of the described encased uncooked dough log in the presence of steam facilitates a desired degree of gelling of the protein and additional ingredients in the dough log, thereby affording a final cooked sausage analogue exhibiting excellent texture and other organoleptic properties.

The thus-prepared encased cooked sausage analogue may be chilled to an internal temperature of from about 30° F. to about 45° F. for storage purposes as appropriate.

It has additionally been found that chilling the cooked sausage analogue facilitates removal of the casing from the cooked sausage analogue. While not being bound by theory, it is believed that chilling enhances the textural difference and/or reduces the adhesion of the cooked sausage analogue and the casing so that removal of the casing can be carried out without damage to the surface of the cooked dough log. In an aspect, encased cooked sausage analogue is chilled to an internal temperature of from about 30° F. to about 40° F. In an aspect, encased cooked sausage analogue is chilled to an internal temperature of from about 30° F. to about 36° F.

In an aspect, after the chilling of the encased cooked sausage analogue, the casing may be removed by a suitable process to provide a non-encased plant-based dough log product.

In an aspect, the sausage analogue is sliced to thicknesses of from about 1.5 mm to about 5 mm to form a sliced sausage analogue. In an aspect, the sausage analogue is sliced to thicknesses of from about 1.5 mm to about 3 mm to form a sliced sausage analogue.

If so desired, the pepperoni analogue sausage may be diced instead of sliced.

EXAMPLES

Example 1. Preparation of Vegan Fat Composition

Ingredients as shown in Table 1 were obtained and a vegan fat composition was prepared using Process Methodology 1.

TABLE 1

(White Blend formulation)

| Ingredient Description | Supplier | 100% formula |
|---|---|---|
| Water | | 52.109 |
| Puris pea protein 870 | Puris | 8.685 |
| Tapioca starch (Cream Gel 70001 | Cargill | 18.859 |
| Konjac high viscosity | TIC Gums | 1.985 |
| Carrageenan Aubygel 1014 | Cargill | 1.985 |
| Coconut oil 76° RBD | Connoils LLC. | 16.377 |
| TOTALS | | 100.000 |

Figure 1:
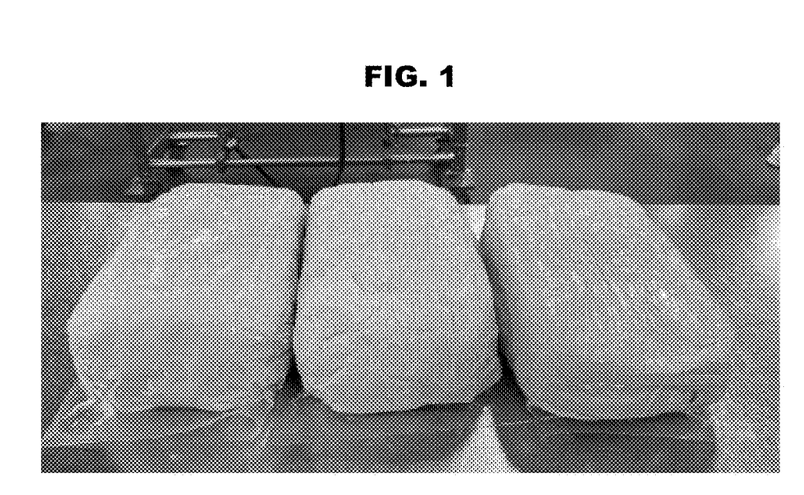
FIG. 1 is a photograph of a packaged paste composition in loaf form.
Figure 2:
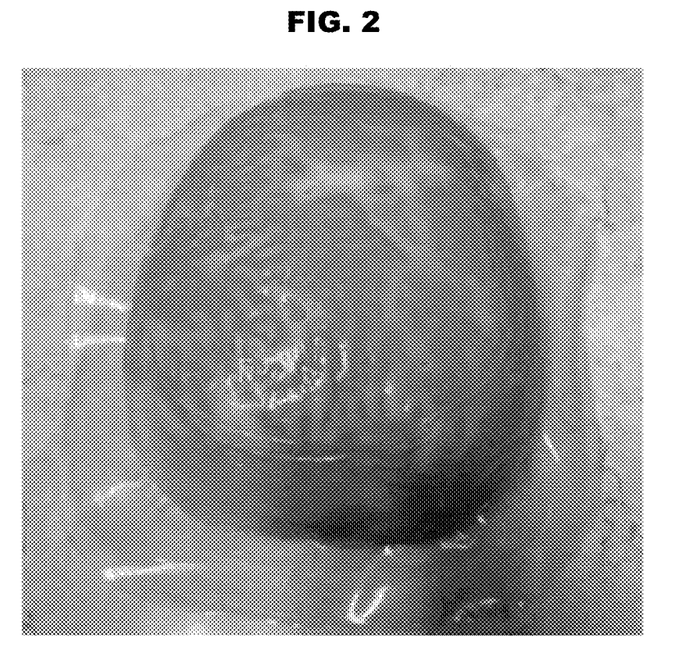
FIG. 2 is a photograph of a packaged paste composition in in half oval form.

Process Methodology 1 Preparation of Vegan Fat Composition
1. Mix the pea protein with the water in a bold chopper to form a hydrated pea protein,
2. Mix the hydrated pea protein with the tapioca starch, carrageenan, and konjac to form a protein intermediate composition,
3. Mix the protein intermediate composition with melted coconut oil to form a paste composition,
4. Apply vacuum in the bowl chopper to remove trapped air from the paste composition,
5. Dispense five-pound portions of the paste composition into pockets formed in a Multivac/Ulma machine and seal to form packaged paste compositions. An example of packaged paste compositions in loaf form are shown in FIG. 1, and an example of a packaged paste composition in half oval form is shown in FIG. 2,
6. Cook the packaged paste composition to an internal temperature of 190° F. and hold for 60 minutes to form a cooked vegan fat having an internal temperature of 197° F.,
7. Cool the cooked vegan fat to an internal temperature of from about 34° F. to about 36° F. to provide a cooled vegan fat. The unopened packages may be stored in a freezer or in a cooler.

The recommended freezer storage time is for up to 365 days, and the recommended cooler storage time is for up to 6 months.

Example 2. Preparation of Vegan Fat Particles

Figure 3:
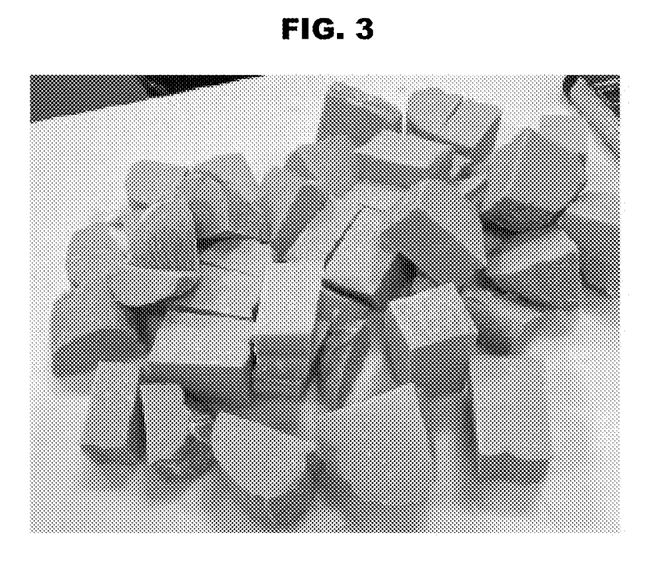
FIG. 3 is a photograph of cooked vegan fat that has been cut into blocks for further processing.
Figure 4:
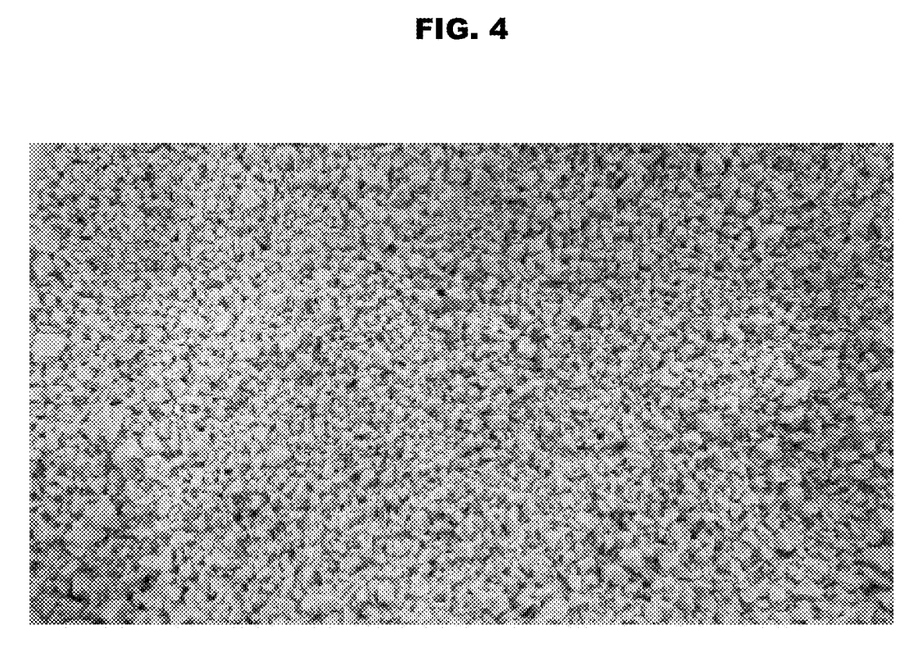
FIG. 4 is a photograph of cooked vegan fat that has been processed into particles.

The vegan fat composition was prepared in Example 1 was reduced to particles using Process Methodology 2.
Process Methodology 2—Chopping Vegan Fat/"White Blend": (Bowl Chopper)
1. Remove cooked vegan fat from the plastic bags and cut into cubes having dimensions of about 3 inch×3 inch×3 inch. See FIG. 3. The approximate product temperature at the time of cutting is 40° F.
2. Add cubes into the bowl chopper.
3. Run the bowl chopper at speeds alternating between Speed 2 (400 RPM FW) and Speed 3 (800 RPM FW) until the cooked vegan fat is cut into particles having a particle size that is predominantly from about 2.5 mm to about 9.5 mm.
4. Remove cut vegan fat particles from the bowl chopper and sieve the vegan fat particles through No. 8 and ⅜ inch sieves to remove fines and larger particles.
5. Put the sieved vegan fat particles in the size range of from about 2.5 mm to about 9.5 mm aside to use in the final blend. See FIG. 4.

Example 3—Preparation of Meat Component of Pepperoni Product ("Red Blend")

Ingredients as shown in Table 2 were obtained and a plant-based pepperoni meat analogue product was prepared using Process Methodology 3.

TABLE 2

(Red Blend formulation)

| Ingredient Description | Supplier | 100% formula |
|---|---|---|
| Water | | 46.457 |
| Puris pea protein 870 | Puris | 5.555 |
| RBWD mid-oleic sunflower oil (52534) | Cargill | 5.050 |
| Coconut oil 76° RBD | Connoils LLC. | 4.966 |
| Natural pork-type flavor 30768951\001 | Kerry | 3.535 |
| Pepperoni seasoning | Kerry | 7.574 |
| Carrageenan (Aubygel 1014) | Cargill | 2.525 |
| Citri-Fi 100 citrus fiber | Fiber Star | 0.707 |
| Konjac high viscosity | TIC Gums | 1.010 |
| Hi Grade Granulated Salt | Cargill | 0.606 |
| Flake Select potassium chloride/salt 50-50 Fine | Cargill | 0.808 |
| Tapioca starch (CreamGel 70001) | Cargill | 1.010 |
| Vital Wheat Gluten (GluVital 21020) | Cargill | 20.199 |
| TOTALS | | 100.00 |

Figure 5:
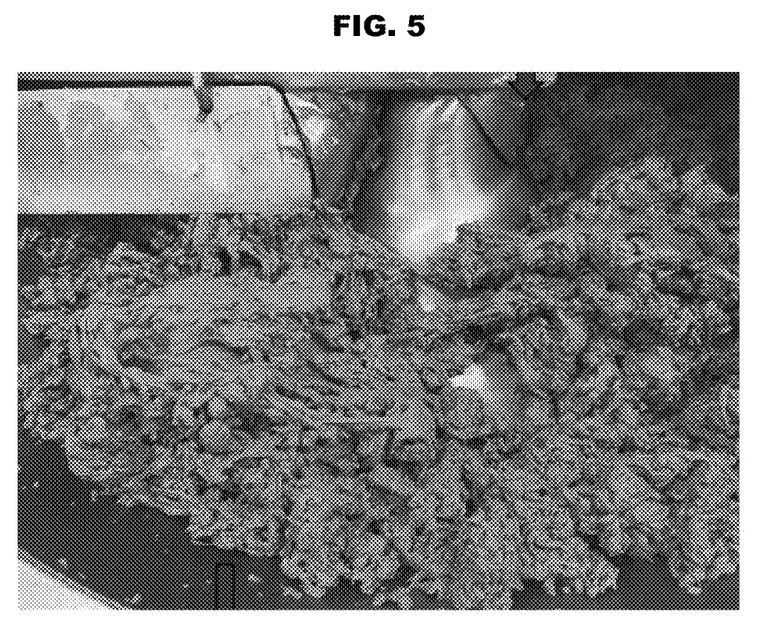
FIG. 5 is a photograph of a stage of preparation of the meat component of the plant-based sausage showing the elastic texture of the intermediate.
Figure 6:
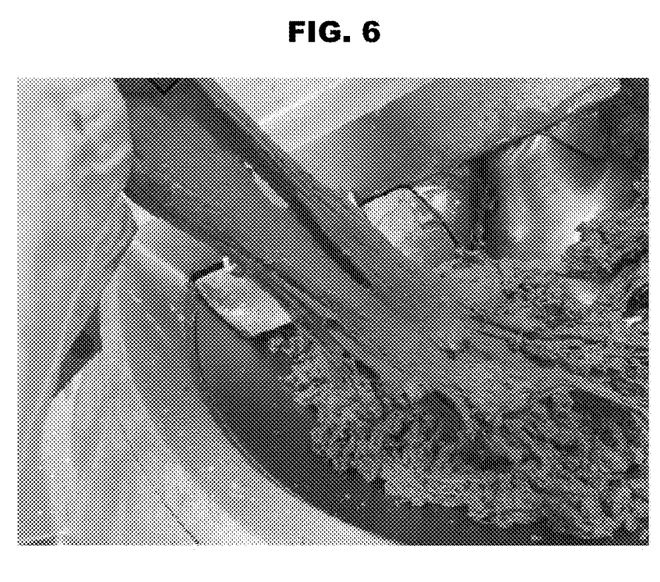
FIG. 6 is another photograph of a stage of preparation of the meat component of the plant-based sausage showing the elastic texture of the intermediate.

Process Methodology 3.
A. Mix Ingredients
1. Add water and pea protein isolate to a mixer and mix well. —3 min at Speed 1 (50 RPM FW).
2. Add sunflower oil and melted coconut oil and mix for eight minutes until oil is mixed well.
3. Add liquid port flavor and pepperoni style seasoning and mix well for 4.5 minutes.
4. Add all hydrocolloids (citrus fiber, carrageenan and Konjac) and mix well for five minutes to form a sticky paste.).
5. Add salts, and tapioca starch and mix well for five minutes.
6. Add all the Vital Wheat Gluten to the mixer and mix well.
7. Transfer blend into bowl chopper.
B. Acidify and Emulsify "Red Blend"
1. Add vinegar to the Red blend in the Bowl Chopper ("BC").
2. Run BC at Speed 3 (800 RPM FW) for 3 minutes until acid is mixed well
3. Run bowl chopper alternatively at Speed 4 (1600 RPM FW) and at speed 5 (3000 RPM FW) for fifteen minutes until it forms an elastic texture. See FIG. 5 and FIG. 6.

Example 4—Preparation of Pepperoni Product by Mixing White Blend with Red Blend

Ingredients as shown in Table 3 were obtained and a plant-based pepperoni meat analogue product was prepared using Process Methodology 4.

TABLE 3

(Final Blend)

| Ingredient Description | Supplier | 100% formula |
|---|---|---|
| Red Blend - pepperoni meat analog from Example 3 | | 80.720 |
| Woeber's Distilled White Vinegar - 200 Grain | Woeber Mustard Manufacturing Company | 0.815 |
| White Blend - Vegan Fat Particles_from Example 2 | | 16.427 |
| MeatShure 333 Encap Citric acid 72% | Balchem | 0.408 |
| MeatShure 509 Encap Lactic acid 30% | Balchem | 1.630 |
| TOTALS | | 100.00 |

Figure 7:
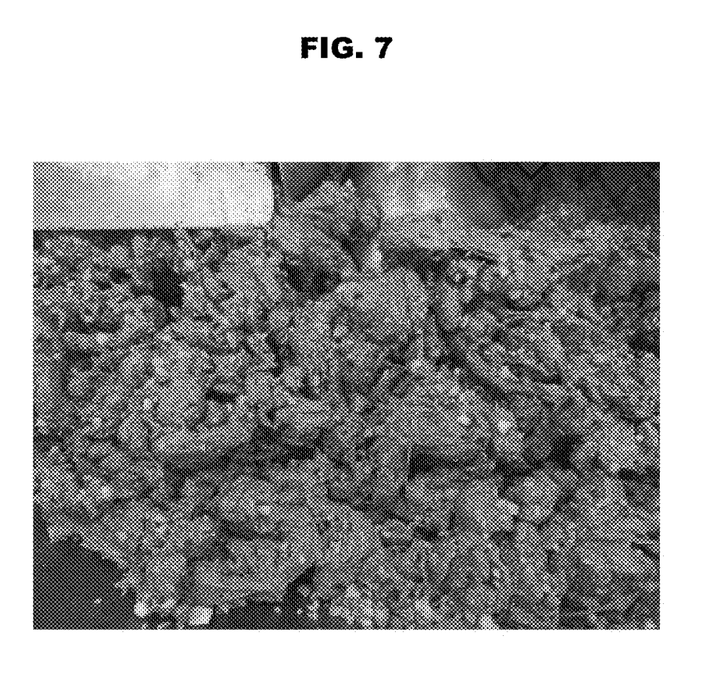
FIG. 7 is a photograph of the meat component intermediate of the plant-based sausage with Vegan Fat Particles distributed therein.

Process Methodology 4
A. Mixing "White & Red Blends for Final Blend"
1. Sprinkle Encap citric & lactic acids into the BC with the Red Blend.
2. Run the Bowl chopper at Speed 3 (800 RPM FW) for 1 min until encap acids get mixed in the Red Blend.
3. Add Vegan Fat Particles and run at Speed 3 (800 RPM FW) for less than 30 Sec until fat particles are evenly distributed in the blend, without breaking the white/Fat particles into smaller pieces. See FIG. 7.
4. Pull vacuum in the bowl chopper before taking the final blend to the stuffer for 5 to 10 minutes.

Stuffing:
1. Stuff final blend into Viscofan blue plastic casing (400020193-Tripan FDA BLUE 45 mm) and stuff for 27-28" long sticks having a round shape with a diameter of from about 44 to 45 mm.

Cooking:
1. Cook sticks in the oven according to the cook cycle below to an internal Temperature that is greater than about 199° F.).
   1st step: 160 F at 100% humidity for 15 min
   2nd Step: 180 F at 100% humidity for 15 min.
   3rd Step: 200 F at 100% humidity for until 180° F. internal temperature
   5th Step: 200 F at 100% humidity for 60 min
   6th Step: Cold shower for 10 min.
2. Chill according to USDA chilling requirement.

Figure 8:
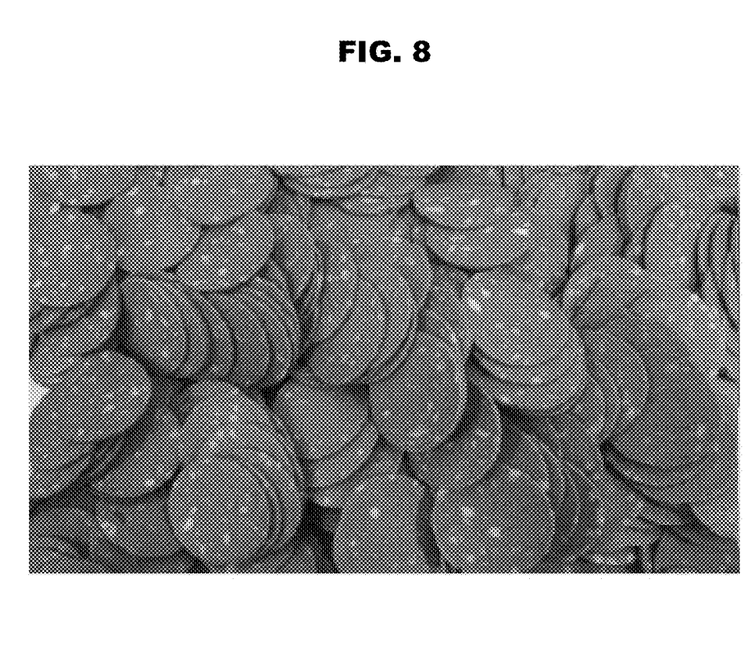
FIG. 8 is a photograph of sliced plant-based pepperoni sausage analogue product made from a vegan fat analogue particle product prepared from pea, collected on a tray.
Figure 9:
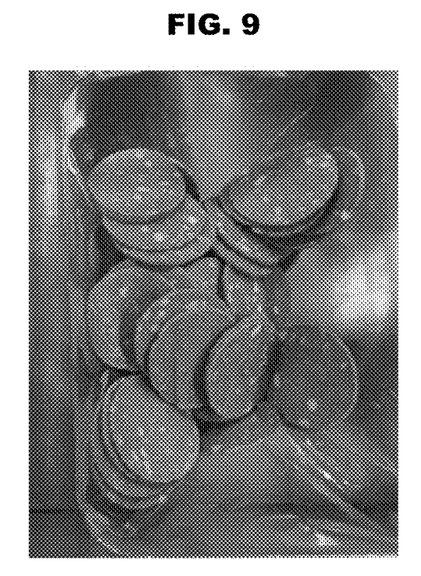
FIG. 9 is a photograph of plant-based pepperoni sausage analogue products made from a vegan fat analogue particle product prepared from pea, placed in Multivac pockets, flushed with 70% nitrogen 30% carbon dioxide gas mix, and sealed in packages.

Slicing & Package
1. Slice to 2.0 mm thickness. See FIG. 8.
2. Vacuum package in multivac pouches (gas flushed 70 N$_2$: 30; 0.5 lbs per pack; 65 slices/pack; top non-forming film and bottom forming film) for storage before evaluation. See FIG. 9.

Storage: Box multivac pouches and store in the freezer.

Example 5: Preparation of Comparative Plant-Based Sausage Analogue

Comparison soy-based fat particles were prepared as described in Examples 1 and 2, using soy protein instead of pea according to the formulation of Table 4:

TABLE 4

| Ingredient Description | Supplier | 100% formula |
|---|---|---|
| Water | | 52.109 |
| Supro EX-45 IP isolated soy protein | Solae | 10.444 |
| Tapioca starch (CreamGel 70001) | Cargill | 16.971 |
| Konjac high viscosity | TIC Gums | 1.985 |
| Carrageenan (Aubygel 1014) | Cargill | 1.985 |
| Coconut oil 76° RBD | Connoils LLC | 16.449 |
| TOTALS | | 100.000 |

Plant-based sausage analogues were prepared as described in Examples 3 and 4, except using the Comparison soy-based fat particles described above.

Figure 10:
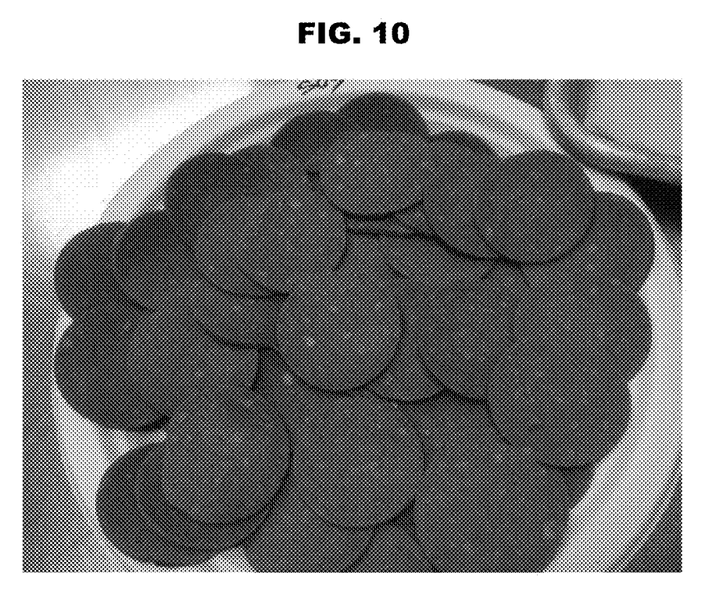
FIG. 10 is a photograph of a plate of comparative plant-based pepperoni sausage analogue made from a vegan fat analogue particle product prepared from soy.
Figure 11:
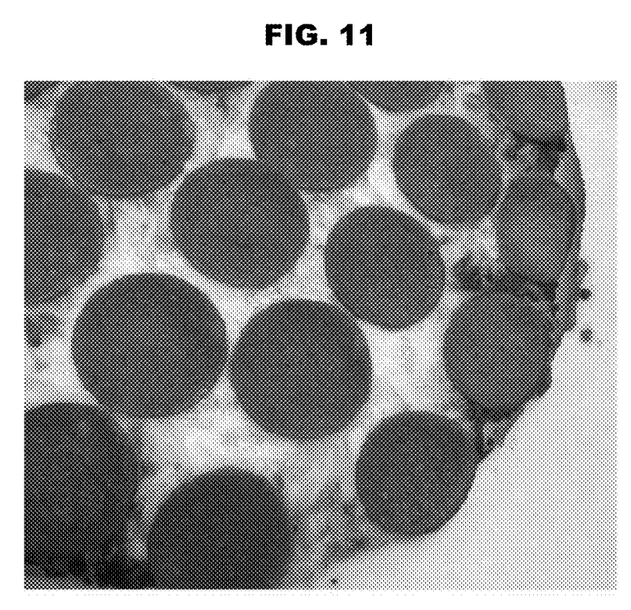
FIG. 11 is a photograph of a comparative plant-based pepperoni sausage analogue made from a vegan fat analogue particle product prepared from soy on a pizza.
Figure 12:
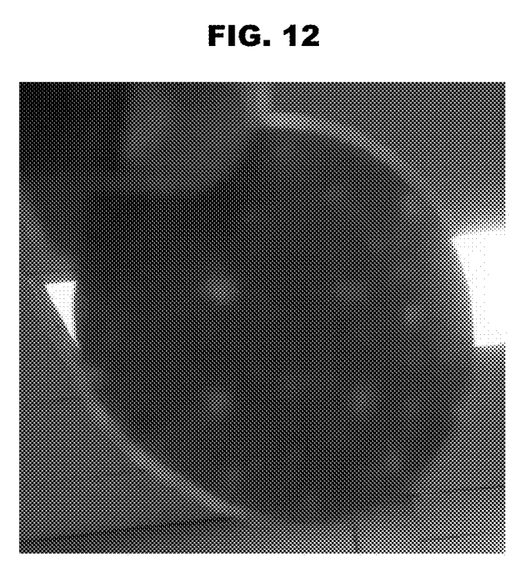
FIG. 12 is a photograph of a backlit comparative plant-based pepperoni sausage analogue made from a vegan fat analogue particle product prepared from soy.

Example 6: Comparison of Plant-Based Pepperoni Slices Made Using Soy Protein Vegan Fat Particles and Pea Protein Vegan Fat Particles FIGS. 10-12 are photographs showing plant-based pepperoni slices made using soy protein vegan fat particles of Comparative Example 5. Specifically, FIG. 10 is a photograph of a plate of comparative plant-based sausage analogues made from a vegan fat analogue particle product prepared from soy. FIG. 11 is a photograph of a comparative plant-based sausage analogue made from a vegan fat analogue particle product prepared from soy on a pizza. FIG. 12 is a photograph of a backlit comparative plant-based sausage analogue made from a vegan fat analogue particle product prepared from soy.

Figure 13:
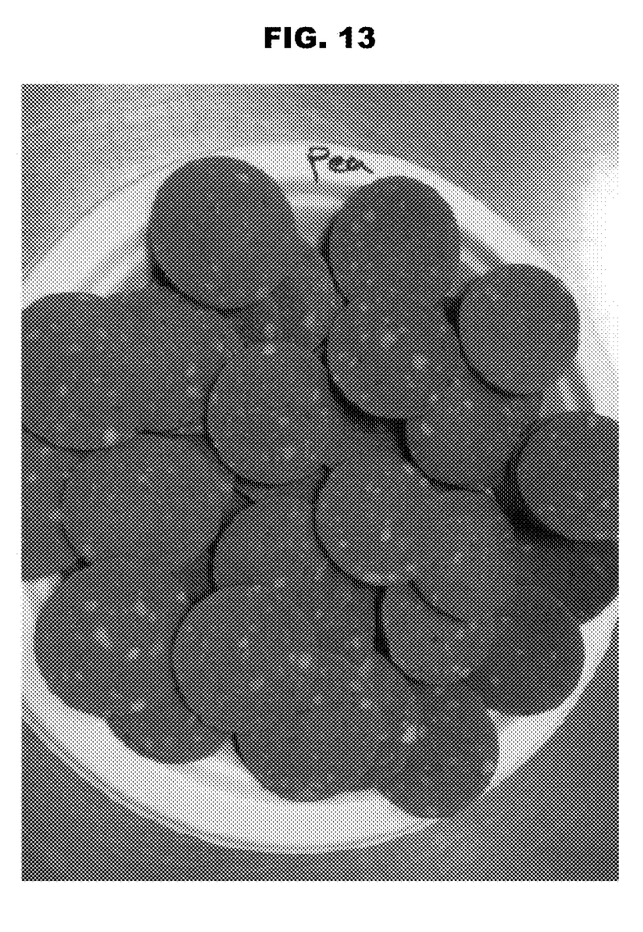
FIG. 13 is a photograph of a plate of plant-based pepperoni sausage analogue made from a vegan fat analogue particle product prepared from pea.
Figure 14:
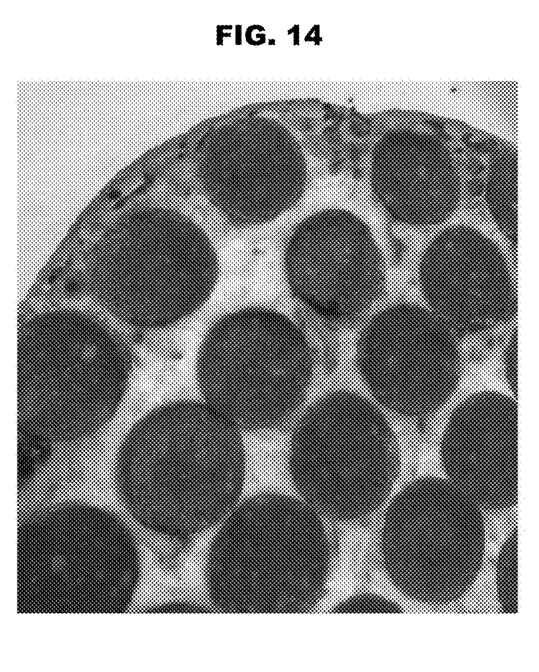
FIG. 14 is a photograph of a plant-based pepperoni sausage analogue made from a vegan fat analogue particle product prepared from pea on a pizza.
Figure 15:
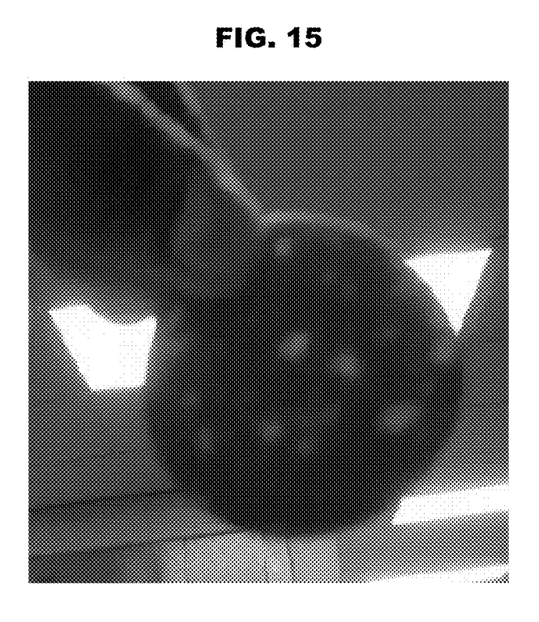
FIG. 15 is a photograph of a backlit plant-based pepperoni sausage analogue made from a vegan fat analogue particle product prepared from pea.

FIGS. 13, 14 and 15 are photographs showing plant-based pepperoni slices made using pea protein vegan fat particles in accordance with the process described in Examples 1-2. Specifically, FIG. 13 is a photograph of a plate of plant-based sausage analogues made from a vegan fat analogue particle product prepared from pea. FIG. 14 is a photograph of a plant-based sausage analogue made from a vegan fat analogue particle product prepared from pea on a pizza. FIG. 15 is a photograph of a backlit plant-based sausage analogue made from a vegan fat analogue particle product prepared from pea.

As can be seen in the figures, the vegan fat particles prepared from soy protein are not very apparent, and the pepperoni analog products do not present the appearance of actual pepperoni sausage slices. In contrast, the vegan fat particles prepared from pea protein are clearly apparent, and the pepperoni analog products present a good representation of the appearance of actual pepperoni sausage slices.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of preparing a vegan fat analogue particle product comprising
   a) mixing plant protein with water to form a hydrated plant protein;
   b) mixing the hydrated plant protein with
      i) tapioca and/or cassava starch,
      ii) carrageenan, and
      iii) konjac
      to form a protein intermediate composition;
   c) mixing the protein intermediate composition with a fat intermediate composition to form a paste composition;
   d) cooking the paste composition to an internal temperature of at least about 180° F. to form a cooked vegan fat analogue;
   e) cooling the cooked vegan fat analogue to an internal temperature of from about 30° F. to about 45° F. to provide a cooled vegan fat analogue; and
   f) reducing the cooled vegan fat analogue to particles to form a vegan fat analogue particle product, wherein at least 90% of the vegan fat analogue particles have a maximum dimension between about 2.5 mm and about 10 mm;
   wherein the vegan fat analogue particle product comprises:
      from about 45 wt % to about 60 wt % water,
      from about 6 wt % to about 12 wt % plant protein,
      from about 10 wt % to about 22 w % oil,
      from about 12 wt % to about 24 wt % tapioca and/or cassava starch,
      from about 1 wt % to about 6 wt % konjac, and
      from about 1 wt % to about 6 wt % carrageenan.

2. The method of claim 1, wherein the plant protein is pea protein.

3. The method of claim 1, wherein the fat intermediate composition comprises coconut oil, cocoa butter, palm oil, palm kernel oil, cottonseed oil, or mixtures or interesterifications thereof.

4. The method of claim 1, wherein the fat intermediate composition has a slip melting point of between 22° C. and 40° C.

5. The method of claim 1, wherein the paste composition is mixed under emulsifying high shear conditions.

6. The method of claim 1, wherein the paste composition is dispensed into a cooking bag and a vacuum is applied before the forming of the paste composition into a vegan fat layer.

7. The method of claim 1, wherein the paste composition is formed into a shape having a maximum thickness in at least one dimension of about 5 inches or less.

8. The method of claim 1, wherein the paste composition is cooked at 80% or higher humidity conditions.

9. The method of claim 1, wherein the paste composition is cooked at 100% humidity conditions.

10. The method of claim 1, wherein the vegan fat analogue particles are sieved to remove fines that would pass through a US Mesh Size 8 screen.

11. A method of preparing a plant-based sausage analogue comprising
   a) preparing a plant protein sausage meat analogue dough having a pH of about 5.5 or lower by:
      (1) mixing non-gluten plant protein with water to form a hydrated non-gluten plant protein,
      (2) mixing the hydrated non-gluten plant protein with a plant-based oil and hydrocolloid to form a protein intermediate composition,
      (3) mixing the protein intermediate composition with Vital Wheat Gluten to form a protein/gluten mixture intermediate composition, and
      (4) mixing the protein/gluten mixture intermediate composition with an edible acid to form a plant protein sausage meat analogue dough;
   b) preparing a vegan fat analogue particle product by:
      (1) mixing plant protein with water to form a hydrated plant protein,
      (2) mixing the hydrated plant protein with tapioca and/or cassava starch, carrageenan, and konjac to form a protein intermediate composition,
      (3) mixing the protein intermediate composition with a fat intermediate composition to form a paste composition,
      (4) cooking the paste composition to an internal temperature of at least about 180° F. to form a cooked vegan fat analogue,
      (5) cooling the cooked vegan fat analogue to an internal temperature of from about 30° F. to about 45° F. to provide a cooled vegan fat analogue, and
      (6) reducing the cooled vegan fat analogue to particles to form a vegan fat analogue particle product, wherein at least 90% of the vegan fat analogue particles have a maximum dimension between about 2.5 mm and about 10 mm;
      wherein the vegan fat analogue particle product comprises: from about 45 wt % to about 60 wt % water; from about 6 wt % to about 12 wt % plant protein; from about 10 wt % to about 22 w % oil; from about 12 wt % to about 24 wt % tapioca and/or cassava starch; from about 1 wt % to about 6 wt % konjac; and from about 1 wt % to about 6 wt % carrageenan;
   c) mixing the plant protein sausage meat analogue dough with the vegan fat analogue particle product in a fat analogue/meat analogue weight ratio of about 0.1 to 0.4 to form a sausage analogue dough composition,
   d) dispensing the sausage analogue dough composition into a casing to form a dough log,
   e) cooking the dough log to an internal temperature of at least about 180° F. to form a cooked sausage analogue, and
   f) chilling the cooked sausage analogue to an internal temperature of from about 30° F. to about 45° F. to provide a plant-based sausage analogue;
   wherein the plant-based sausage analogue has a pH of about 5.5 or lower.

* * * * *